Aug. 30, 1960  W. J. GILBERT  2,950,932
STRUT BEARING SEAL
Filed Jan. 14, 1957
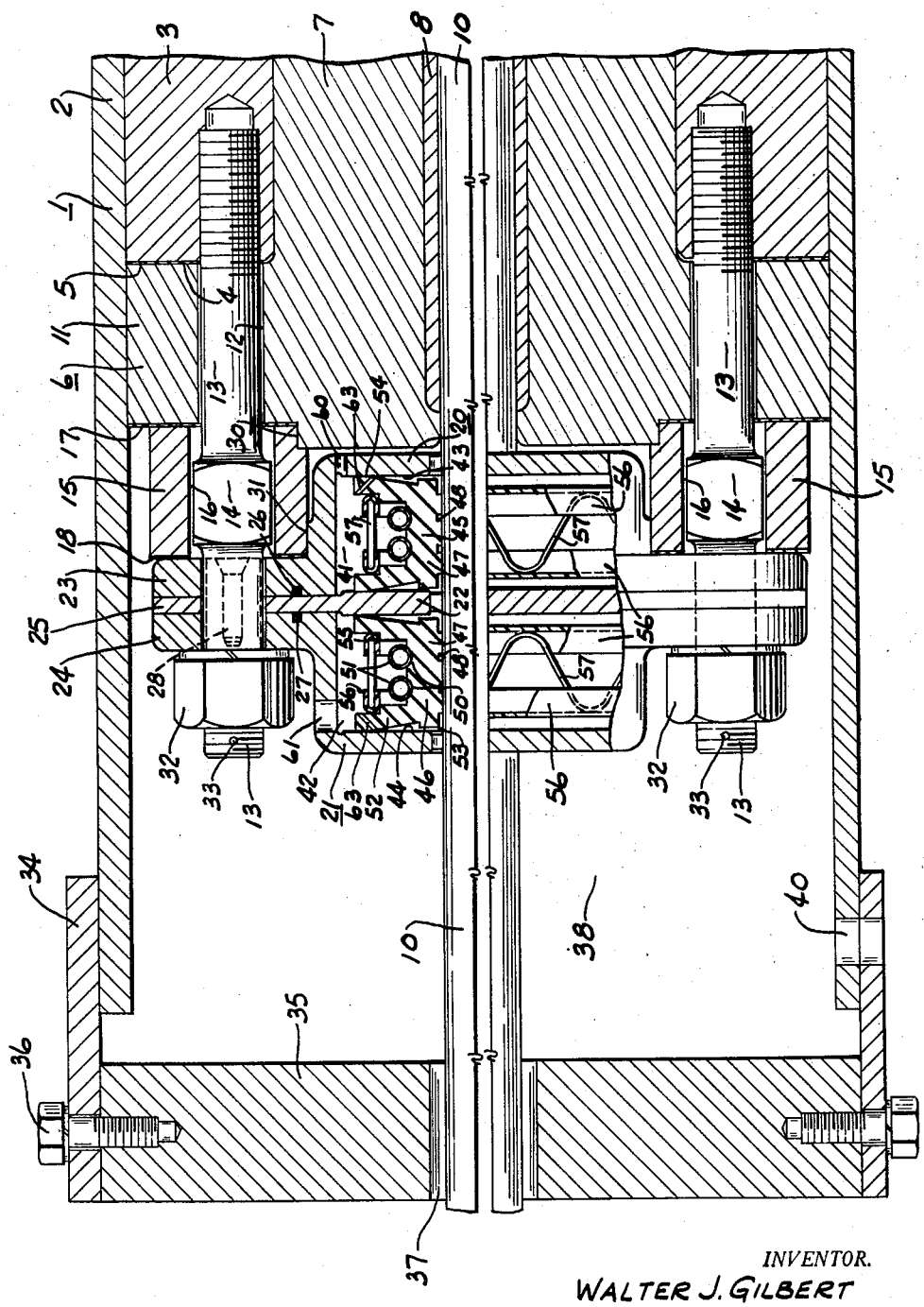
INVENTOR.
WALTER J. GILBERT
BY
HIS ATTORNEY

United States Patent Office 2,950,932
Patented Aug. 30, 1960

2,950,932

STRUT BEARING SEAL

Walter J. Gilbert, Indiana, Pa., assignor to Syntron Company, Homer City, Pa., a corporation of Delaware Filed Jan. 14, 1957, Ser. No. 634,112

6 Claims. (Cl. 286—8)

This invention relates generally to propeller shaft seals and more particularly to a strut bearing seal for the propeller shafts of river boats for sealing out mud in suspension.

The principal object of this invention is the provision of a seal that is mounted on the aft face of a strut bearing housing to keep fine mud and silt, that are carried in suspension in the river waters from entering the strut bearing and wearing the same.

Another object is the provision of a sand trap chamber within the strut bearing housing adjacent the seal to catch the larger and heavier particles but permits the lighter particles in suspension to enter into one half of the seal chamber and operate on one seal member causing it to block further movement of the suspended material toward the bearing. A second seal member just like the first is placed adjacent the bearing and is washed with clean water and operated under pressure to prevent any entry of anything carried in suspension from passing into the bearing.

Another object is the provision of a two part housing with an independent dividing wall that has a sealing wearing surface on both sides thereof and which is bolted in assembled relation providing a very simple and economical and improved construction. Each housing part is vented in the wall opposite the independent dividing seal wall to admit fluid from the opposite direction to the seal chambers. The seal members which are preferably flexible synthetic rubber of the Buna N type are generally U-shaped in cross section with outwardly extending annular flanges, one of which is vented and the other engages the sealing plate. The body of these sealing members embraces the shaft to seal thereon and cause the same to travel with the shaft.

Other objects and advantages appear hereinafter in the following description and claims.

The accompanying drawings show for the purpose of exemplification without limiting the invention or claims thereto certain practical embodiments of the invention wherein the sectional view shows the seal as applied to the strut bearing housing of a river boat.

Referring to the drawing the strut bearing housing 1 has the outer casing 2 and the heavier inner casing 3 which are integral with the hull of the boat or ship. The inner casing 3 has an end face 4 against which the gasket 5 is placed before mounting the strut bearing carrier thereon. The bearing carrier 6 has a long cylindrical section 7 to receive and carry bearing metal 8 that supports the shaft 10. The cylindrical section 7 has the radially annular mounting flange 11 provided with holes 12 that align and receive the studs 13 threadably secured in the bearing inner casing 3.

The studs 13 have an intermediate head section 14 that permits them to be screwed into the casing 3 but these heads although larger than the holes 12 do not clamp the flange 11. The heads 14 could be smaller than the holes 12 or eliminated entirely. A spacer ring 15, having holes 16 aligned with the studs 13 and large enough to admit the heads 14, is mounted on the outer face of the flange 11 and has an annular gasket 17 and 18 on each face.

The seal housing is made in three parts, preferably of brass or bronze, and comprises an inner housing section 20 and the outer housing section 21, which are annular angle members having substantially the same construction and could be interchanged. The third part of this seal housing is the flat seal wearing plate 22 in the form of a large washer that is mounted between the other two sections 20 and 21. Each latter section has a cylindrical portion and an outwardly extending flange at one end thereof. These flanges 23 and 24 clamp the perimetral portion 25 of the seal wearing plate therebetween. The face of each of the flanges 23 and 24 is provided with an annular groove 26 to receive the O rings 27 that seal against the flange section 25 of the seal wearing plate 22. These flanges are faced and ground to provide a good fit with each other and they have aligned holes to receive the assembly screws 28 that hold these seal parts in assembled relation. Larger holes are provided in these flange sections 23, 24 and 25 to receive the studs 13 that hold the assembled seal against the gasket 18 on the outer face of the spacer block 15. The spacer block is notched at 30 to receive the sharp corner of the bearing carrier 6 and the inner seal housing section 20 has the finished corner 31 to receive the bore of the spacer 15. Thus each of these members are held in rigid alignment relative to the shaft bearing. The nuts 32 and lock washers on the studs 13 hold the seal assembly, the spacer ring 15 and bearing carrier 6 in position on the housing 3. A lock key 33 may be provided on the end of the stud to prevent the nut from coming off the stud if it becomes loosened.

The outer housing section 2 extends beyond the assembled seal and is provided with a cylindrical band 34 that receives and holds the end cover plate 35 by the bolts 36. Water is admitted in the clearance hole 37 between the end cover plate 35 and the shaft 10 to the chamber 38. The bottom of the end plate 35 and housing section 2 have aligned openings 40 to permit the heavy silt to pass out of the chamber 38.

The assembled seal has two chambers, the inner chamber 41 and the outer chamber 42, separated by the radial seal wearing plate 22.

The opposite ends of the cylindrical portions of the housing sections 20 and 21 have the inwardly extending annular walls 43 and 44. The inner surface of these walls provides seal wearing surfaces. As shown the three housing parts forming the chambers 41 and 42 are spaced from the shaft 10, and the seal members 45 and 46, which are identical members, each have a body section 47 the bore of which is grooved, as indicated at 48, to provide labyrinths to prevent the movement of fluid between the seal element and the shaft when the former is tightly clamped on the latter.

These seal elements 47 may be integral annular rings in which case the propeller, not shown, would have to be removed from the shaft to slip them on. If this is not desired the housing sections 20, 21 and 22 and the sealing elements 47 may all be split and mounted around the shaft then bolted in sealed relation. The rubber seal element may then be made as a continuous member that would wrap as a helix and only that length need be cut off to form the seal element. The cutting of these rubber seal elements permits the ends to abut and mate in sealing engagement.

Each sealing body 47 is provided with two troughs 50 to receive the helical garter springs 51 that have their ends hooked together to cause the seal body to tightly embrace and seal on the shaft 10 and be rotated therewith.

The flanges 52 of these seal elements project from the body 47 spaced from its ends 53 which form solid abutments. However, the flanges project radially and axially beyond the abutments to engage the walls 43 and 44 and both faces of the seal wearing plate 22. This portion of each flange is the seal portion 54 and is held by the pressure of the flexed flange against the stationary wearing surface that it engages. To augment the pressure the flanges are provided with the offset shoulders 55 to receive the annular shields 56 that are merely grooved brass or plastic members that receive the ends of a laterally expanding spring 57 which is in the form of a sine wave and which forces the flanges outwardly against their corresponding wearing surfaces to seal with the same.

As shown, the seal housings 20 and 21 are provided with holes 60 and 61 to admit fluid to their chambers 41 and 42. This fluid if under pressure aids to expand the flanges against their respective wearing plates.

The seal is made against the central seal wearing plate 22 from both sides thereof. The opposite flanges are vented as indicated at 63 to insure free passage of fluid to and from the respective seal chambers and lubrication of these outer flanges remote of the seal flanges.

Clean water or oil or other suitable liquid may be forced down the bearing 8 to lubricate the same and this under pressure will also serve the inner seal member in chamber 41. Regardless of the end play of the shaft, which is considerable because these river boats frequently reverse their engines to accept and discharge tows and to turn around, the abutments 53 cause the seal elements to slide back and forth on the shaft 10 but the sealing flanges maintain their sealed engagement.

The sand trap chamber 38 always has water therein and the movement of the propeller shaft keeps this water in motion. This water carries an exceedingly fine sediment in suspension, which is almost colloidal, and is also within the chamber 42 but cannot pass the seal plate 22. When this water is kept from the shaft bearing regardless of whether it is rubber or metal it prevents the bearing from wearing and extends its life from a few months to several years.

I claim:

1. An outboard propeller shaft seal comprising an annular housing of two sections each of which provides a cylindrical portion having an outwardly extending annular flange on one end and having on its other end an inwardly extending annular wall with axially aligned opening to receive the propeller shaft, a plate having its outer perimetral portion mating and mounted between said flanges and its inner portion forming a wall extending between said other walls and having an axially aligned opening and forming two inwardly open chambers, an annular seal member in each chamber to engage, seal on and rotate with the propeller shaft that would extend through said axially aligned openings, flanges on said seal members having sealing contact with both sides of said plate to prevent the movement of fluid in either direction.

2. An outboard propeller shaft seal to be mounted in sealed relation to the hull of a ship comprising an annular housing, to provide an annular stationary sealing chamber around the shaft, said housing having annular sealing end walls, an annular partition in said chamber forming two independent chambers, an annular sealing surface on each side of said annular partition, an annular rubber seal member in each of said independent chambers and having a body section to grip and seal on the shaft to rotate therewith and having spaced outwardly disposed annular flexible flanges engaging and sealing with the annular sealing surfaces on opposite sides of said partition, and a flat sine wave annular spring extending between the flanges of each seal member to expand them axially into sealing relation.

3. The structure of claim 2 characterized by a passage in each side of said housing to connect each chamber independently to the adjacent area exterior of said housing and around said shaft.

4. An outboard propeller shaft seal for the hull of a ship comprising an annular housing surrounding the shaft, to provide an annular stationary sealing chamber around said shaft, said housing having annular sealing end walls, an annular partition in said chamber forming two independent chambers, an annular sealing surface on each side of said annular partition, an annular rubber seal member in each of said independent chambers and having a body section gripping and sealing on said shaft to rotate therewith and having spaced outwardly disposed annular flexible flanges engaging and sealing with the annular sealing surfaces on opposite sides of said partition and an annular spring extending between the flanges of each seal member to expand and hold them axially in sealing relation, the flange of each seal member remote of said annular partition having a passage therethrough.

5. The structure of claim 4 characterized in that said passage opens in the outer surface of said flange radially inwardly of its sealing surface.

6. The structure of claim 2 characterized in that said annular housing and seal members being supported as an assembled annular unit and said housing is split in two parts separated by said annular partition, and means sealing the annular partition with each housing part.

References Cited in the file of this patent

UNITED STATES PATENTS

| | | |
|---|---|---|
| 1,142,260 | McGuire | June 8, 1915 |
| 1,294,620 | Clarke | Feb. 18, 1919 |
| 1,331,522 | Parsons et al. | Feb. 24, 1920 |
| 1,436,738 | Underhill | Nov. 28, 1922 |
| 1,499,583 | Leroy | July 1, 1924 |
| 1,902,792 | Warner | Mar. 21, 1933 |
| 2,210,823 | Victor | Aug. 6, 1940 |
| 2,445,018 | Brady | July 13, 1948 |
| 2,712,459 | Wahl | July 5, 1955 |
| 2,761,709 | Gilbert | Sept. 4, 1956 |
| 2,896,987 | Meyer | July 28, 1959 |

FOREIGN PATENTS

| | | |
|---|---|---|
| 171,596 | Austria | Dec. 15, 1951 |
| 511,217 | Germany | Oct. 29, 1930 |
| 905,084 | Germany | Feb. 25, 1954 |
| 7,795 | Great Britain | Mar. 27, 1914 |